United States Patent [19] [11] 4,142,039
Le Brasseur [45] Feb. 27, 1979

[54] PROCESS FOR REMOVING CATALYST RESIDUES FROM POLYOLEFINS

[75] Inventor: Geneviéve Le Brasseur, Bully Les Mines, France

[73] Assignee: Societe Chimique des Charbonnages CdF Chimie, Paris, France

[21] Appl. No.: 813,301

[22] Filed: Jul. 6, 1977

[30] Foreign Application Priority Data

Jul. 9, 1976 [FR] France .............................. 76 621114

[51] Int. Cl.$^2$ .............................................. C08F 6/24
[52] U.S. Cl. .................................... 528/496; 526/351; 528/494
[58] Field of Search ........................................ 528/496

[56] References Cited

U.S. PATENT DOCUMENTS 3,271,372  9/1966  Caywood .............................. 528/496

FOREIGN PATENT DOCUMENTS 831582   1/1970  Canada.
887315   1/1962  United Kingdom ............. 528 UX/495
958862   5/1964  United Kingdom.
1080140  8/1967  United Kingdom ............. 528 UX/496

Primary Examiner—Stanford M. Levin
Attorney, Agent, or Firm—Finnegan, Henderson, Farabow & Garrett

[57] ABSTRACT

In purifying polyolefins obtained by suspension polymerization to remove catalyst residues therefrom, the polymer is first separated from the polymerization medium and then degassed in the absence of air. Next the degassed polymer is deactivated by suspension in a liquid medium comprising a liquid hydrocarbon, an aliphatic alcohol having 1 to 4 C atoms, and an organic chloride which is an acid chloride or an alkyl chloride, the suspension being at a temperature of +30, +65° C. Finally the deactivated polymer is separated from the liquid medium and washed with an aliphatic alcohol and/or a liquid hydrocarbon.

12 Claims, No Drawings

PROCESS FOR REMOVING CATALYST RESIDUES FROM POLYOLEFINS

BACKGROUND OF THE INVENTION

The present invention is concerned with a process for the purification of polyolefins and, more particularly, with a process for removing catalyst residues present in polyolefins obtained by Ziegler-Natta catalysis and with the purified polyolefins having a very low residual content of impurities thus obtained.

In numerous processes for the synthesis of polymers of ethylene, propylene, 1-butene or 1-hexene, the reaction product contains metallic residues resulting from the use of organo-metallic catalysts, such as alkyl-aluminums and titanium chlorides. Regardless of the catalysts employed, the polymeric product isolated from the reaction mixture exhibits several short-comings due to the presence of catalyst residues: it readily becomes discolored and becomes unstable after a long period of storage or when heated. Although methods of overcoming these disadvantages are known, the most economical method of avoiding them is to remove the catalyst residues at the time of production of the polymer.

In processes in which an olefin is polymerized by means of a Ziegler-Natta catalyst in suspension in a diluent, several means for reducing the amount of catalyst residues in the polymer have been described in the prior art. For example, British Specification No. 887,315 describes a process in which the polymer is reacted, at a temperature above 70° C., with a heavy alcohol in the presence of a liquid hydrocarbon and an acid chloride, and the polymer is washed by means of a liquid hydrocarbon. This reaction is not very efficient since, as stated in example 3 of the British specification, the amount of catalyst residues is only reduced to 300 ppm when 48 mols of acetyl chloride per mol of Ziegler-Natta catalyst are used. More efficient processes are also known in which, still in the presence of an alcohol, either a reactant that is hazardous to handle such as a mineral acid (British Specification No. 1,080,140) or an expensive reactant such as an organic ester is used. The content of each catalytic metal (aluminum, titanium) may not be reduced under 10 ppm in commercial homopolymers by means of these processes.

It is thus an object of the invention to provide a process for the purification of polyolefins using reactants which do not give rise to the aforementioned problems.

Another object of the invention is to provide such a process which provides polyolefins with a content of catalyst residues reduced to an amount at least as low as that of known commercial products.

SUMMARY OF THE INVENTION

According to the present invention, there is provided a process for the purification of an olefin polymer obtained by polymerization in suspension in an inert organic diluent, which comprises the steps of
1. removing the polymer from the polymerization medium,
2. degassing the polymer in the absence of air,
3. suspending the degassed polymer in a liquid medium comprising a liquid hydrocarbon, an aliphatic alcohol having 1 to 4 carbon atoms and an organic chloride selected from the group consisting of acid chlorides and alkyl chlorides, the suspension being at a temperature of from 30° to 65° C., whereby the polymer is deactivated, and
4. separating the deactivated polymer and washing it at least once with a liquid selected from the group consisting of aliphatic alcohols and hydrocarbons.

DESCRIPTION OF THE PREFERRED EMBODIMENTS

The olefin polymers to which the process, according to the invention, can be applied include, for example, high density polyethylene, polypropylene, polybutene, polyhexene and copolymers of these olefins with one another, such as, in particular, ethylene-propylene copolymers.

The organic diluent used in the suspension polymerization may, for example, be an aliphatic hydrocarbon such as is usually employed in low pressure suspension polymerization processes. Examples of such aliphatic hydrocarbons are propane, butane, and the like.

Preferred aliphatic alcohols for use in the liquid medium used in step (3) are alcohols having a straight or branched chain of 1 to 4 carbon atoms, for example, methanol, isopropanol or n-butanol. The liquid hydrocarbon which forms part of the same liquid medium preferably has a straight or branched aliphatic chain or an alicyclic ring of 5 to 7 carbon atoms and is, for example, cyclopentane, methylcyclohexane or n-heptane. The volume ratio of the hydrocarbon to the alcohol in the liquid medium is generally from 1:1 to 20:1, and it is preferred that the relative proportions of the hydrocarbon and the alcohol should be such that they form an azeotropic mixture which can be recycled indefinitely, rather than a mixture that would involve the need to have two process lines and would thus complicate the installation.

The temperature used in step (3) depends on the liquid medium used and will be the appropriate temperature for the azeotrope where the proportions of hydrocarbon and alcohol are such that one is formed, as is preferred. Preferred temperatures are, for example, 54° C. for the methanol-cyclohexane mixture, and 39° C. for the methanol-cyclopentane mixture.

The amount of the liquid medium which is used to suspend the degassed polymer should be such that the agitation or stirring system used can readily maintain the polymer in suspension. The amount of liquid medium therefore depends on the equipment used and typically will be from 1 to 10 liters of liquid medium per kg of polymer.

The alkyl chloride used in step (3) is preferably a monochloride of a $C_2$ to $C_6$ straight or branched aliphatic hydrocarbon or a $C_6$ to $C_{12}$ alkylaryl or alicyclic hydrocarbon, for example, tert-butyl chloride or benzyl chloride. The chloromethyl ethers, chloroformic esters and allyl chloride are also suitable. The acid chloride used in step (3) is preferably an acid chloride derived from a straight or branched $C_2$ to $C_6$ aliphatic hydrocarbon or a $C_6$ to $C_{12}$ alkylaryl or alicyclic hydrocarbon, for example, acetyl chloride or benzoyl chloride. Among all these compounds, acetyl chloride is particularly preferred. Its presumed mechanism of action is different from that of the mineral acids used in the prior art; it is presumed that the deactivation reaction produces intermediate products which are ketones.

The number of mols of organic chloride used to purify a certain amount of polymer is preferably from 0.1 to 20 times the number of mols of Ziegler-Natta catalyst (organic derivatives of aluminum, and titanium chloride) which were used to prepare the polymer. The duration of the deactivation stage is preferably less than two hours, as no improvement in the result is achieved beyond this limit. After deactivation, the polymer is separated from the suspension by any suitable means, such as filtration or centrifuging. The aliphatic alcohols and the hydrocarbons which are used in the washing stage are preferably the same as are used in the deactivation stage, step (3). The polymer is preferably washed repeatedly until the pH of the alcohol at the end of the treatment is from 5 to 6 and has a negative chloride ion reaction. In an industrial installation, washing can be carried out by means of one or more decanting vessels or in a counter-current system.

In order that the invention may be more fully understood, the following examples are given by way of illustration only.

EXAMPLES 1 AND 2:

A propylene homopolymer having a melt index of 7 dg/min, which has been polymerized in suspension and separated from its polymerization medium and then degassed in the absence of air, was suspended, at a temperature T° C., in a mixture of methylcyclohexane and isopropanol, the volume ratio of the former to the latter being R, and acetyl chloride being present in the mixture in a molar ratio r relative to the constituents Al and Ti of the catalyst residues present in the polymer before the deactivation stage. All the constituents of the mixture were rendered anhydrous by distillation over sodium and (or) drying over molecular sieves and were kept under nitrogen until used.

The polymer was maintained in suspension for one hour, while stirring, and the suspension was then fed into a centrifuge where the drained polymer was washed at room temperature with methylcyclohexane and finally with methanol. The purified polypropylene, to which the usual amount of antioxidants had been added, was dried in a vacuum oven. It was then analysed by the usual techniques for determining the weight content of catalyst residues in parts per million. The values of T, R and r, which were different in the two examples, are indicated in Table I below, together with the results of the purification.

TABLE I

| Example | T° C. | R | r | Residues ppm |
|---|---|---|---|---|
| 1 | 45 | 3 | 7 | 20 |
| 2 | 60 | 7.5 | 2 | 18 |

As regards Example 2, it was established that the atomic content of aluminum was 6.6 ppm and that of titanium was less than 5 ppm (limit of detection).

EXAMPLE 3

The following operations were carried out in a glass reactor kept under nitrogen and passivated by contact with monochlorodiethylaluminum solution. Propylene and 1-butene were bubbled into and dissolved in one liter of methylcyclohexane at 20° C. 8 millimols of monochlorodiethylaluminum followed by 0.2 millimol of a catalyst of the Ziegler type, based on titanium trichloride, were added. The polymerization was carried out for 3 hours at a temperature of about 32° C. When the solution had become very viscous and could no longer be stirred properly, it was syphoned, under nitrogen pressure, into 1 liter of isopropanol containing 1 cm$^3$ of acetyl chloride, and the mixture was stirred vigorously. The polymer precipitated in the form of a white gel swollen with solvent. The mixture was filtered and the polymer was washed with 1 liter of methanol to which the usual antioxidants were added. After drying in vacuo, analyses showed that the propene-butene copolymer, containing 42% by weight of butene units, contained 100 ppm of catalyst residues.

EXAMPLES 4 TO 7

The operation carried out in examples 1 and 2 were repeated except that other organic chlorides were substituted for acetyl chloride. R again represents the volume ratio of methylcyclohexane to isopropanol, and r the molar ratio of the chloride used to the catalytic constituents present in the polymer before deactivation. The values of T, R and r and the chloride used in each example are indicated in Table II below, as well as the results of purification.

TABLE II

| Example | Chloride | T° C. | R | r | Residues ppm |
|---|---|---|---|---|---|
| 4 | Benzyl | 50 | 3 | 4.3 | 100 |
| 5 | Benzoyl | 50 | 3 | 4.3 | 60 |
| 6 | Tert-butyl | 45 | 3 | 2.2 | 50 |
| 7 | Tert-butyl | 60 | 7.5 | 2 | 18 |

What is claimed is:

1. A process for the purification of an olefin polymer obtained by polymerization in suspension in a medium including an inert organic diluent by means of a Ziegler-Natta catalyst, which comprises the steps of
   1. removing the polymer from the polymerization medium,
   2. degassing the polymer in the absence of air,
   3. suspending the degassed polymer in a liquid medium comprising a liquid hydrocarbon, an aliphatic alcohol having 1 to 4 carbon atoms and an organic chloride selected from the group consisting of acid chlorides and of monochlorides of a hydrocarbon selected from the group consisting of $C_2$ to $C_6$ aliphatic hydrocarbons and $C_6$ to $C_{12}$ alkylaryl and alicyclic hydrocarbons, the volume ratio of said liquid hydrocarbon to said aliphatic alcohol being from about 1:1 to 20:1 and the proportional amount of said organic chloride being 0.1 to 20 mols per mol of catalyst used to prepare said polymer, the suspension being at a temperature from 30° to 65° C., whereby the polymer is deactivated, and
   4. separating the deactivated polymer from the liquid medium and washing it at least once with a wash liquid selected from the group consisting of aliphatic alcohols and hydrocarbons.

2. A process for the purification of an olefin polymer obtained by polymerization in suspension in a medium including an inert organic diluent by means of a Ziegler-Natta catalyst, which comprises the steps of
   1. removing the polymer from the polymerization medium,
   2. degassing the polymer in the absence of air,
   3. suspending the degassed polymer in a liquid medium comprising a liquid hydrocarbon, an aliphatic alcohol having 1 to 4 carbon atoms and an acid chloride derived from a hydrocarbon selected from the group consisting of $C_2$ to $C_6$ aliphatic hydrocarbons and $C_6$ to $C_{12}$ alkylaryl and alicyclic hydrocarbons, the suspension being at a temperature from 30° to 65° C., whereby the polymer is deactivated, and 4. separating the deactivated polymer from the liquid medium and washing it at least once with a wash liquid selected from the group consisting of aliphatic alcohols and hydrocarbons.

3. A process according to claim 2, wherein said acid chloride is acetyl chloride.

4. A process according to claim 2, wherein, in step (3), said acid chloride is used in a proportion of 0.1 to 20 mols per mol of catalyst used to prepare said polymer.

5. A process according to claim 2, wherein, in step (3), the volume ratio of said liquid hydrocarbon to said aliphatic alcohol is from about 1:1 to 20:1.

6. A process according to claim 1, wherein in step (3), said liquid medium comprises an azeotropic mixture of said liquid hydrocarbon and said aliphatic alcohol having 1 to 4 carbon atoms.

7. A process according to claim 6, wherein said mixture is a methanol-cyclohexane mixture and said temperature is about 54° C.

8. A process according to claim 6, wherein said mixture is a methanol-cyclopentane mixture, and said temperature is about 39° C.

9. A process according to claim 1, wherein, in step (3), said aliphatic alcohol is a member selected from the group consisting of methanol, isopropanol, and n-butanol.

10. A process according to claim 1, wherein, in step (3), said liquid hydrocarbon has a straight or branched aliphatic chain or an alicyclic ring of 5 to 7 carbon atoms.

11. A process according to claim 10, wherein said liquid hydrocarbon is a member selected from the group consisting of cyclopentane, methylcyclohexane, and n-heptane.

12. A process according to claim 1, wherein, in step (4), said wash liquid comprises the same aliphatic alcohols and hydrocarbons as are used in step (3).

* * * * *

UNITED STATES PATENT OFFICE
CERTIFICATE OF CORRECTION

Patent No. 4,142,039            Dated Feb. 27, 1979

Inventor(s) GENEVIEVE LE BRASSEUR

It is certified that error appears in the above-identified patent and that said Letters Patent are hereby corrected as shown below:

On the first page, under the heading "Foreign Application Priority Data" the number of the French priority document should be changed from "76 621114" to -- 76 21114 --.

Signed and Sealed this

*Twenty-second* Day of *May 1979*

[SEAL]

*Attest:*

RUTH C. MASON
*Attesting Officer*

DONALD W. BANNER
*Commissioner of Patents and Trademarks*